United States Patent
Philipp

(10) Patent No.: US 9,410,101 B2
(45) Date of Patent: Aug. 9, 2016

(54) PROCESS FOR OBTAINING ENERGY FROM ORGANIC-CONTAINING WASTE MATERIALS

(71) Applicant: Commerzialbank Mattersburg Im Burgenland Aktiengesellschaft, Mattersburg (AT)

(72) Inventor: Franz Josef Philipp, Forchtenstein (AT)

(73) Assignee: COMMERZIALBANK MATTERSBURG IM BURGENLAND AKTIENGESELLSCHAFT, Mattersburg (AT)

( * ) Notice: Subject to any disclaimer, the term of this patent is extended or adjusted under 35 U.S.C. 154(b) by 89 days.

(21) Appl. No.: 14/367,293

(22) PCT Filed: Dec. 20, 2012

(86) PCT No.: PCT/AT2012/050202
§ 371 (c)(1),
(2) Date: Jun. 20, 2014

(87) PCT Pub. No.: WO2013/090967
PCT Pub. Date: Jun. 27, 2013

(65) Prior Publication Data
US 2014/0338255 A1    Nov. 20, 2014

(30) Foreign Application Priority Data
Dec. 21, 2011  (AT) .................. A 1860/2011

(51) Int. Cl.
*C10L 5/12*  (2006.01)
*B01J 2/00*  (2006.01)
(Continued)

(52) U.S. Cl.
CPC . *C10L 5/48* (2013.01); *B09B 3/005* (2013.01); *B09B 3/0041* (2013.01); *B09B 3/0083* (2013.01); *Y02E 50/30* (2013.01)

(58) Field of Classification Search
CPC ......... C10L 5/48; B09B 3/0041; B09B 3/005; B09B 3/0083; Y02E 50/10; Y02E 50/30
USPC .......................................................... 44/595
See application file for complete search history.

(56) References Cited

U.S. PATENT DOCUMENTS 5,087,375 A * 2/1992 Weinwurm .......... B01J 37/0018
                                                    210/667
5,888,256 A * 3/1999 Morrison .................. C10L 5/40
                                                    44/504

(Continued)

FOREIGN PATENT DOCUMENTS

| AT | 389 474 B | 5/1988 |
| CH | 688 990 A5 | 11/1994 |

(Continued)

*Primary Examiner* — Pamela H Weiss
(74) *Attorney, Agent, or Firm* — Lucas & Mercanti, LLP; Jonathan Myers

(57) ABSTRACT

A process is disclosed for obtaining energy from organic-containing waste materials by (1) precomminuting the waste material and determining its ratio of carbonaceous material and silicatic material; (2) further measuring the constituents in the waste material to determine the ratio of carbonaceous material and silicatic material; (3) maintaining the ratio of carbonaceous material and silicatic material at about 90% to 10%; (4) adding phyllosilicate to the waste material, separating the resulting mixture into solid, liquid and gaseous phases, and pelletizing the solid phase; (5) pyrrolizing the pellets forming a second gaseous phase and a second solids phase; and (6) supplying the second gaseous phase to a tank, and separating the second solids phase into end product carbonaceous and silicatic materials, and recovering the carbonaceous materials.

5 Claims, 1 Drawing Sheet

(51) Int. Cl.
*G01N 23/20* (2006.01)
*C10L 5/40* (2006.01)
*C10L 5/48* (2006.01)
*B09B 3/00* (2006.01)

(56) References Cited

U.S. PATENT DOCUMENTS

2010/0137126 A1   6/2010   Philipp

2011/0099890 A1*  5/2011  Bohlig ...................... C10L 5/46
                                                          44/320

FOREIGN PATENT DOCUMENTS

DE          3329771 A1      4/1984
NL     WO 2011159154 A1 *  12/2011  ............... B01J 21/16

* cited by examiner

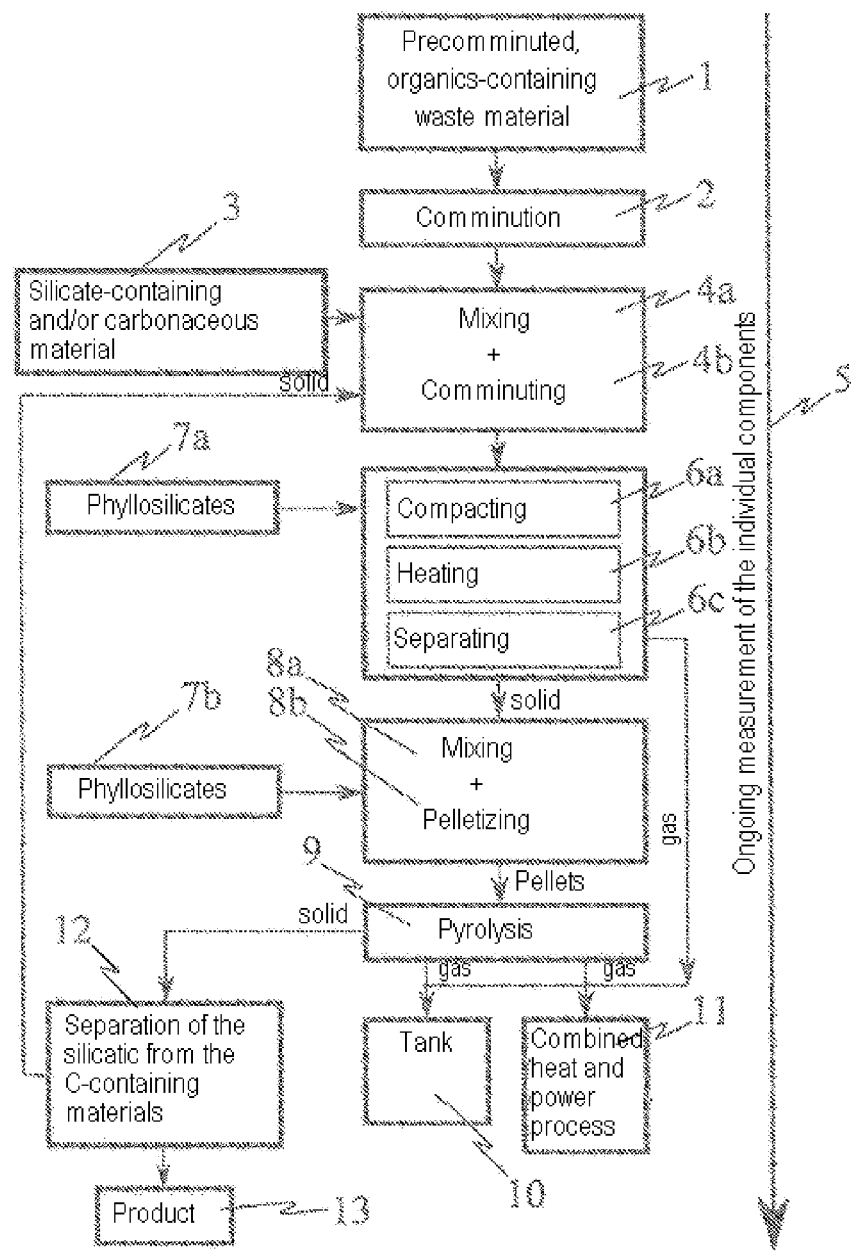

PROCESS FOR OBTAINING ENERGY FROM ORGANIC-CONTAINING WASTE MATERIALS

CROSS REFERENCE TO RELATED APPLICATIONS

This application is the U.S. National Phase of PCT/AT2012/050202 filed 20 Dec. 2012 and claiming the benefit of the priority of Austrian Patent Application A 1860/2011 filed 21 Dec. 2011.

The present invention relates to a process for energy recovery from organics-containing waste materials.

The technological background includes U.S. Pat. No. 5,087,375, AT 389 474 B, CH 688 990 A5, and DE 33 29 771 A1. U.S. Pat. No. 5,087,375 describes a method for treating hazardous and toxic wastes which comprise organic substances and metals for the purpose of producing insoluble industrial raw material, where the waste materials are mixed with polymeric material comprising inorganic compounds which form stable compounds with the metals, moldings are formed from the plastics mixture obtained, and are heat-treated in order to remove the plastics material, and the inorganic substances remaining are bound by calcining and sintering to form stable, insoluble complex compounds.

AT 389 474 B discloses the use of fine mineral, silicatic/carbonatic fractions for the ordered deposition of ultrafine and/or pasty waste materials, the fine mineral fractions enveloping or infiltrating the waste materials and forming a matrix.

CH 688 990 A5 relates to the reprocessing of organic and/or inorganic residues from old, reconstructed landfills and/or fresh garbage to form a material which can be re-used, with elimination of pollutants.

The above-identified DE 33 29 771 A1 the binding of pollutants in the production of briquettes made from organic products or from waste products, where inorganic compounds are added for the chemical binding of pollutants in a compression-molding operation and/or on pyrolysis/incineration.

DE 10 2007 006 137 A1 discloses a hybrid product comprising organic and inorganic particulate materials and/or mixtures of materials, which together form a substantially homogeneous matrix. With the aid of an additive (auxiliary), the possible properties of an end product are calculable beforehand, and this additive leads to the formation of crystal structures with a high specific internal surface area, and it meets a variety of goal-oriented functions, such as, for example, energy media or substances for energy conversion, porosity-generating agents, structuring agents, reducing agents and/or filter material.

The goal pursued by the invention is that of providing a process for energy recovery from organics-containing waste materials, by which a carbonaceous product is supplied in solid, liquid, and gaseous form to a tank for storage and/or directly to a combined heat and power process for driving.

This goal is achieved in accordance with the invention in that a) the organics-containing waste materials in pre-comminuted form are subjected to a measurement for identifying the constituents and also to determination of the ratio of the fraction of carbonaceous material to the fraction of silicatic material, in order to ensure, by admixing carbonaceous and/or silicatic material where appropriate, that the ratio of carbonaceous to silicatic material is about 90% to about 10% in the waste materials for further processing, b) as the process continues, there is ongoing measurement of the fractions of carbonaceous material and silicatic material, c) the organics-containing waste materials are further comminuted and mixed with additional tectosilicate-containing materials, with continued comminution down into the μ range, d) compacting of the comminuted waste material mixture is carried out, with addition of phyllosilicates, heating of the mixture, and separation thereof into individual solid, liquid, and gaseous phases under reduced pressure, after which the solids which remain are mixed with further-added phyllosilicates and are pelletized, e) the pellets produced are subjected to pyrolysis, and f) the gaseous substances obtained in this procedure are supplied to a tank and/or to a combined heat and power process, while the solids recovered undergo separation of silicatic from carbonaceous materials, with the carbonaceous materials recovered therefrom being stored as end product.

The advantage of the present invention lies, by comparison with conventional processes, in that wastes currently lacking any or lacking great recyclability can be reprocessed in an energy recovery system to give high-value products such as metals, silicates, and carbon and/or carbon compounds.

The % figures for fractions of constituents or components hereinafter are in each case % by weight, calculated relative to dry matter, unless otherwise specified.

"Organics-containing waste materials" encompass, for example, domestic garbage, industrial garbage, sewage sludge, recovered paper materials, and the like, comprising whatever kind of organic material and/or biological residuals, such as, for example, paper, wood, textiles, plastics, etc. The fraction of organic materials in the individual waste materials that can be employed is 70-90% in the case of domestic garbage with 6000-12 000 kJ/kg dry matter, 50-90% in the case of industrial garbage with 15 000-36 000 kJ/kg dry matter, 80-95% in the case of sewage sludge with 1000-5000 kJ/kg dry matter, and 75-95% in the case of recovered paper materials with 2000-8000 kJ/kg dry matter, the requirement being for at least 40% of organic materials.

Examples of "silicate-containing materials" with which the waste materials are mixed are tectosilicates, silicatic minerals, such as a wide variety of granitic rocks, for example, vulcanites, silica sand, construction rubble, and the like.

BRIEF DESCRIPTION OF THE DRAWING

FIG. 1 is a block diagram disclosing a process for recovering energy from waste materials.

The invention is elucidated in more detail below with reference to FIG. 1, which shows a flow diagram in accordance with the invention for a process for energy recovery.

The organics-containing waste materials 1 which serve as input energy are pre-comminuted and subjected to a measurement of the constituents for the purpose of identifying the constituents, and also to a determination of the ratio of the fraction of carbonaceous material to the fraction of silicatic material. The nature of the waste materials used as starting material is to be such that the ratio of carbonaceous to silicatic material therein is about 90% to about 10%. If values deviating from this ratio are found, then carbonaceous and/or silicatic material must be added until the carbonaceous and silicatic materials in the waste materials for further processing are present in the 9:1 ratio. It should be noted here that the individual components of the materials used are subject to ongoing measurement 5 throughout the process. The pretreated organics-containing waste materials 1 are digested or further comminuted 2. Thereafter, in a continued comminution step, a greater fineness, preferably down into the μ range, is achieved, with addition and mixing 4a of tectosilicates and/or finely ground silicatic minerals 3 as additives.

The additives, and also, for example, construction rubble, have a greater degree of hardness than the waste materials, and hence act as abrasives, thus producing, on further comminution 4b, a finely divided hybrid product of organic and inorganic substances, which at the same time are fiberized by means of refiner grinding. The additives, which advantageously may also be fine silicatic substances from a blast furnace, are used with a component size of 0.001 to 3 mm, with the fraction of substances with a component size of below 50 μm being approximately 40%.

As a result of further fine grinding, the individual pieces of the respective composition of substances are reduced to a size of less than or equal to 50 μm. The fraction of substances with a 3 mm fine-particle size, i.e., with a diameter of more than 3 mm, is around 5%, and the fraction of substances with a 1 mm fine-particle size is around 8%; the remainder has a fine-particle size with a diameter of below 1 mm, the principal fraction possessing a size of less than 100 μm. This fine-particle distribution ratio is relevant for the stabilization of the mixture or of the framework construction.

In the course of the ongoing monitoring of the process, there is measurement of the composition and identification of the individual components 5 of the comminuted or ground mixture produced, by means of powder diffractogram, in order to allow targeted compacting 6a, heating 6b, and subsequent separation 6c of the individual components in the subsequent process step. In this case, essentially, a variety of measurements are carried out, yielding the following data:
    the fineness of grinding,
    the distribution index,
    the weight,
    the moisture,
    the pH.

The elemental composition of the raw material prepared is determined continuously by means of X-ray fluorescence analysis (XFA), with a determination in particular of the carbon content.

These captured data enter a computer processing unit, where they are compared with functionally dependent or physically dependent values, thereby enabling, in a targeted manner, the compacting 6a, heating 6b, and subsequent separation 6c of the individual components; in this context, if they are not already present in the silicatic material, it is necessary to add adjuvants composed of phyllosilicates 7a, such as clay with at least 50% iron. Preference is given here to using iron-rich phyllosilicates, or phyllosilicates containing iron-like cations, preferably from the group of mafic phyllosilicate minerals, such as chlorites, smectites, illite, biotite, and the like. The compacting 6a here is dependent on the moisture, the temperature, the $CO_2$ content, and the phyllosilicate fraction, where $CO_2$ formed serves presently as compression medium.

The mixture of waste materials is compacted 6a under pressure in a preliminary chamber, the preliminary chamber further comprising a (hydro)cyclone-type chamber in which, by heating 6b, there is a separation 6c of metals (heavy metals), silicates, and carbonaceous materials according to specific weight, melting point, and conductivity. In other words, there is a separation 6c analogous to that in a centrifuge: a rotational movement causes outward movement of the particles formed in the course of the heating 6b—in which the cations introduced via the mafic phyllosilicates, such as iron or iron-like cations, are oxidized with reduction of $CO_2$—and also particles containing such oxidized cations, thereby producing a mechanical separation into individual solid, liquid, and gaseous phases by means of centrifugal force. This occurs in dependence on the materials, typically at 40° C. to 850° C., with the materials present under reduced pressure in the (hydro)cyclone-type chamber. The liquid phase consists predominantly of liquefied organic material (plastics material). It should be borne in mind here that among the particles of material having a specific weight (density) of ≤0.09 N/m³ (weight force per unit volume), a residual silicate fraction remains of 1.4% to 1.7%, but not more than 5%. The resulting gaseous phase is supplied directly to a tank 10 and/or to a combined heat and power process 11.

As a result of the compacting 6a of the mixture under its own moisture content, the particle size of the mixture, made up of waste materials and added silicatic material, is fashioned in such a way that the interstices between the compacted particles ensure supply of heat. The size of the particles and their density therefore determine the reduction/oxidation process and the reaction time. The ratio by volume of compacted material to interstices in the framework-/skeleton-like solid material produced as a result of the added phyllosilicates is generally about 2:3.

The mode of functioning of the (hydro)cyclone-type chamber for the separation of the individual components of the compacted material is substantially analogous to that of a centrifuge. Since the particles move outward in the chamber, there is a classifying of the particles according to specific weight. Depending on the respective specific weight, the particles entrained by a stream of material emerge at precisely defined emergence points in the marginal area of the chamber, resulting in a precise separation of the individual components. The carrier for this stream of material is usually enriched $CO_2$ gas, in order to minimize the heat loss during the operation.

The separation 6c of the entire mass of the raw material produced takes place in the absence of air, by removal of air with a vacuum pump via the specific weight, which conveys the material into closed silos, with separation into a pure carbonaceous component and a pure silicate component.

In the transition from the preliminary chamber to a main chamber, the solids are admixed and hence mixed 8a with finely divided phyllosilicates 7b, examples being clay(s) and/or clay-mineral material as binder(s), the mass of solids in turn being intended to attain or have a carbonaceous material content of about 90% and a silicatic material content of about 10%, in order for pellets to be produced by pelletizing 8b. The finely particulate phyllosilicates 7b are, for example, clay minerals or materials rich in clay minerals, such as kaolin, montmorillonite, or bentonite, for example. These phyllosilicates 7b have a binder effect only in the moist state, preferably at a moisture content of about 15% to 25%. In addition, the phyllosilicates 7b support the separation of the individual components.

The objective of the pelletizing 8b is to ensure the conveyability of the solids, for which purpose the solids are required to have precisely defined particle size, particle content, and moisture.

In the main chamber, the materials mixture, present in the form of pellets, is subjected to pyrolysis 9 in general at 600° C. to 800° C., there also being a phase separation and hence a splitting of the gaseous and solid substances, as a result of their different densities, in the absence of air.

The separation takes place generally by means of a (hydro)cyclone, which receives the operational material supplied from the reactor via a vacuum pump. The vehicles used for the quantitative flow are preferably $CO_2$ gases, which ensure a high energy balance. With this process, the energy is not blown into the chimney and lost, but instead is utilized in a process-efficient way. A further advantage is that the carbon compounds in the gas mixture give up energy via a heat exchanger, in a targeted way, and are therefore utilized directly. In principle there are further possibilities for separation, such as a shaker table or up-current classifier, although all of the separation possibilities must always take place in the absence of air.

The separated gaseous and solids substances are thereafter subjected to separate further processing. The gaseous substances which remain are supplied to the tank 10 or to the combined heat and power process 11, while the solids which remain are separated 12, with utilization of different densities, into silicatic material and carbonaceous material; the silicatic material can be returned to the first process stage, that of the mixing 4a and comminuting 4b of the waste materials 1, and the carbonaceous fraction is stored as product 13 or supplied directly to the combined heat and power process 11.

The remaining residue forms a reusable silicatic binder, which can be returned and utilized as tectosilicate for the comminuting 4b of the organics-containing waste materials 1.

In other embodiments of the invention, different individual process steps can be omitted and in part replaced by comparable steps, without affecting the fundamental objective of energy recovery.

The subject matter of the present invention is elucidated in more detail by means of the examples below.

EXAMPLE 1

A light fraction from an auto shredder, comprising the organics-containing material obtained in the shredding of old automobiles, following magnetic removal of metal particles, is mixed in pre-comminuted form, in an amount of 92%, with sands, clays, and lime residues in an amount totaling 8%, based in each case on the weight of the dry mass, and this mixture is comminuted. With continued mixing and further comminution, the particles of the mixture are digested down into the μ range; ongoing measurement ascertains the fractions of carbonaceous material and silicatic material. In dependence on the ratio of the fractions that is ascertained, tectosilicates, in the present instance pumice, are admixed, with continued comminution and with fiberization of the organics-containing material in a refiner operation, so that the ratio of carbonaceous material to silicatic material is approximately 9:1.

This pre-processed mixture material is compacted in a preliminary chamber with addition of about 20% of mafic, ultrafinely divided phyllosilicate, in the present instance chlorite, based on the total silicate fraction, with formation of a cake which remains porous, and this compacted cake is progressively heated to about 500° C. in the absence of air. This causes the cake to fall apart, and there is separation into the individual aggregate states in a cyclone-type chamber. The gas phase, and also the liquid phase formed from liquefied organic material (plastics), are stored in tanks, for their further utilization. The solids which remain are admixed with further phyllosilicates, in the present instance montmorillonite, and these components are mixed and pelletized. The pellets formed, whose silicate fractions amount to approximately 2.8%, are subsequently subjected to pyrolysis under anaerobic conditions at around 530° C. In this pyrolysis, the pellets, constructed of framework-/skeleton-like material, fall apart into fine particles, with a separation again into gas, liquid, and solid phases. The separated silicatic material is recycled as raw material into the system, for renewed use. The carbonaceous materials are stored for energy recovery or supplied directly to a combined heat and power process.

EXAMPLE 2

Organic domestic garbage (plastic, leather, etc.) in precomminuted form, in an amount of about 85%, is mixed and comminuted with construction rubble (gypsum plasterboard panels, etc.) in an amount of about 15%, based on the weight of the dry mass, and this comminuted mixture is further subjected essentially to the process regime as per example 1, with the exception of the conditions and parameters specified hereinafter:
  i) In the present instance, the tectosilicate used, which is added in the refiner operation, is perlite.
  ii) Chlorite as mafic phyllosilicate is added, in the present instance, in an amount of about 15%, based on the overall silicate fraction.
  iii) Following removal of gas phase and liquid phase, the solids which remain are admixed with kaolin as a further phyllosilicate.
  iv) The pellets have a silicate fraction of about 1.9%.
  iiv) The pyrolysis takes place at a temperature of about 610° C.

EXAMPLE 3

Paper sludge, in an amount of about 78%, is mixed and comminuted with recovered paper materials with a silicate fraction of about 40%, which makes up about 10% based on the overall mass, in an amount of about 22%, based in each case on the weight of the dry mass, and this comminuted mixture is further subjected essentially to the process regime as per example 1, with the exception of the conditions and parameters specified hereinafter:
i) In the present instance, the tectosilicate used, which is added in the refiner operation, is finely ground granitic mineral.
ii) Biotite as mafic phyllosilicate is added, in the present instance, in an amount of about 17%, based on the overall silicate fraction.
iii) Following removal of gas phase and liquid phase, the solids which remain are admixed with bentonite as a further phyllosilicate.
iv) The pellets have a silicate fraction of about 2.4%.
v) The pyrolysis takes place at a temperature of about 585° C.

The invention claimed is:
1. A process for recovering energy from a waste material containing carbonaceous material, which comprises the steps of:
  (a) precomminuting the waste material containing carbonaceous material and subjecting the precomminuted waste material to a measurement of its constituents for the purpose of determining the ratio of a fraction of the carbonaceous material to a fraction of silicatic material in the precomminuted waste material,
  (b) following step (a), further measuring the constituents in the precomminuted waste material to determine the fraction of carbonaceous material and the fraction of the silicatic material in the comminuted waste material;
  (c) further comminuting the precomminuted waste material and mixing the comminuted waste material with additional tectosilicatic material, carbonaceous material or tectosilicatic material and carbonaceous material to form a mixture to ensure that the ratio of carbonaceous material to silicatic material is about 90% to about 10% in the mixture and further comminuting the mixture down to the micron range;

(d) adding a phyllosilicate to the mixture comminuted down to the micron range formed according to step (c) to form a mixture comprising a phyllosilicate, compacting the mixture comprising the phyllosilicate, heating the mixture comprising the phyllosilicate under reduced pressure, separating the mixture comprising the phyllosilicate into solid, liquid and gaseous phases, and mixing the solid phase with additional phyllosilicate and pelletizing the solid phase mixed with additional phyllosilicate;

(e) pyrolizing the pellets obtained according to step (d) to form a second gaseous phase and a second solids phase; and (f) supplying the second gaseous phase obtained according to step (e) to a tank or to a combined heat and power process, separating the second solids phase into an end product carbonaceous material and silicatic material, recovering the end product carbonaceous material, and storing the end product carbonaceous material.

2. The process for recovering energy defined in claim 1 wherein according to steps (a) and (b) the ratio of the fraction of the carbonaceous material to the fraction of the silicatic material is determined by means of a powder diffractogram.

3. The process for recovering energy defined in claim 1 wherein following step (f), the silicatic material is recycled to step (c).

4. The process for recovering energy defined in claim 1 wherein the gaseous phase obtained according to step (d) and the second gaseous phase obtained according to step (e) are supplied to a tank or to a combined heat and power process.

5. The process for recovering energy defined in claim 1 wherein according to step (d) the separation of the mixture into solid, liquid and gaseous phases is carried out using rotational movement.

* * * * *